No. 701,710. Patented June 3, 1902.
S. GLEAZEN.
TIRE HEATER.
(Application filed Nov. 19, 1901.)
(No Model.)
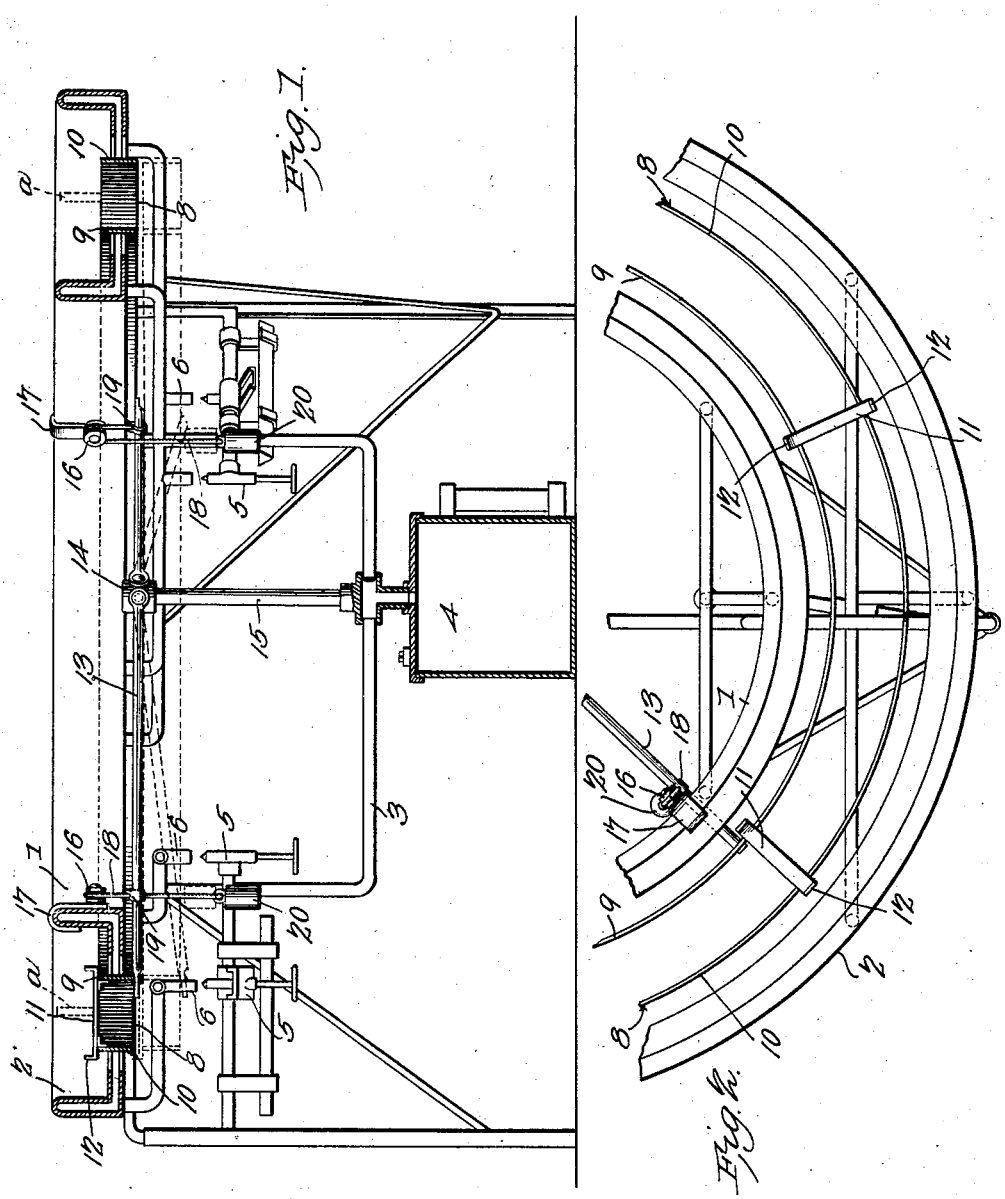
Witnesses
E. J. Stewart
J. W. Garner
S. Gleazen, Inventor
by C. A. Snow & Co.
Attorneys

UNITED STATES PATENT OFFICE.

SILAS GLEAZEN, OF CASPER, WYOMING.

TIRE-HEATER.

SPECIFICATION forming part of Letters Patent No. 701,710, dated June 3, 1902.

Application filed November 19, 1901. Serial No. 82,928. (No model.)

*To all whom it may concern:*

Be it known that I, SILAS GLEAZEN, a citizen of the United States, residing at Casper, in the county of Natrona and State of Wyoming, have invented a new and useful Tire-Heater, of which the following is a specification.

My invention is an improvement in tire-heaters such as described in Letters Patent of the United States No. 681,213, granted to me August 27, 1901, in which there are concentrically-disposed burners separated by an interspace and discharging toward each other; and the object of my present improvements is to provide a fender which is adapted to carry the tire or work to be heated and which is movable into and out of the said interspace, so that when the tire or work is removed the fender is disposed between the burners and occupies the space previously occupied by the tire, thus preventing the burners from becoming extinguished by discharging directly against each other and by discharging their vapor so rapidly that the same does not ignite.

With this and other objects in view my invention consists in the peculiar construction and combination of devices hereinafter fully set forth and claimed.

In the accompanying drawings, Figure 1 is a vertical sectional view of a tire-heater embodying my improvements. Fig. 2 is a partial top plan view of the same.

The general construction of the tire-heater is such as is shown and specifically described in the Letters Patent hereinbefore mentioned, the burners 1 2 being annular in form, disposed concentrically, with an interspace between them, and discharging toward each other. The burners are supplied with the vapor of gasolene or other liquid hydrocarbon by pipes 3, which lead from a tank 4, which pipes are provided with valves 5 and mixers 6. In the operation of the tire-heater the tire is supported between the annular burners and is heated by the flames from the burners which are caused to impinge upon opposite sides of the tire. An objection heretofore existing to the said tire-heater is that when the tire is removed from the interspace after being heated the escape of vapor from the burners is so rapid that the same become extinguished before another tire can be placed in position to be heated. To remedy this effect, I have devised a fender 8, which forms the support for the tire and which is movable into and out of the space between the burners, so that when the tire or work is removed the fender becomes immediately disposed between the burners and occupies the space previously occupied by the tire, thus preventing the burner from becoming extinguished.

In the form of my invention here shown the fender is circular in form and comprises the annular inner and outer sections 9 10, which are concentrically disposed, with a space of suitable width between them. On the said sections are secured bridge-pieces 11, which connect them together at suitable regular distances apart, and the ends of the said bridge-pieces are upturned, as at 12. The inner section of the fender is connected to the outer ends of a series of radially-disposed arms 13, the inner ends of which are pivoted to a suitable support, here shown as a cap 14 at the upper end of a standard 15, that rises from the tank or reservoir 4. A series of pulleys 16, which correspond in number with the arms 13, are respectively carried by hooks 17, which are engaged with and supported by the inner annular burner 1. Suitable flexible connecting elements 18, which are chains or wire cords, are connected to the arms 13, as at 19, pass over and engage the pulleys 16, and are provided with counterbalancing-weights 20. The combined weight of the weights 20 is sufficient to raise the fender to the position shown in full lines in Fig. 1 in the space between the annular burners 1 2 when the tire is not on the fender. In this position the fender operates to prevent the flames from the burners from being extinguished, as hereinbefore described. When the tire, which is indicated at *a*, is placed on the fender, the latter is depressed by the weight of the tire and moves out of the space between the burners and disposes and supports the tire in the said space. The sections 9 10 of the fender have their lower edges outturned at points immediately above the feed-pipes to form notches or recesses in the lower edges of said sections to clear the feed-pipes when the fender is lowered, said feed-pipes supporting the fender when lowered.

I do not desire to limit myself to the precise construction and combination of devices herein shown and described, as it is evident that modifications may be made therein without departing from the spirit of my invention.

Having thus described my invention, I claim—

1. In a tire-heater, the combination with annular burners disposed one within the other and discharging toward each other, of a fender adapted to be moved through the space between said burners, and to be disposed between them, said fender having means to carry the tire, substantially as described.

2. The combination with a tire-heater having annularly-disposed concentrically-arranged burners discharging toward each other, of a fender movable between said burners, for the purpose set forth, said fender being adapted to carry the tire, and moving out of the interspace between said burners when the tire is disposed between them, substantially as described.

3. The combination with a tire-heater having annularly-disposed concentrically-arranged burners discharging toward each other, of a fender adapted to carry a tire, and yielding means to dispose the fender when unloaded, in the space between said burners, substantially as described.

4. The combination with a tire-heater having burners discharging toward each other, of a yieldably-supported fender adapted to carry the work, said fender when unloaded, being disposed between the burners and when loaded supporting the work, between the burners, substantially as described.

5. The combination with a heater having burners disposed opposite and discharging toward each other, of a fender movable to and from the space between the burners, and counterbalancing means to support said fender, substantially as described.

6. The combination with a heater having burners disposed opposite and discharging toward each other, of a fender movable to and from the space between the burners, a pivotally-supported arm connected to said fender and a weight to support and raise said arm and fender, substantially as described.

7. The combination with a tire-heater having concentrically-disposed burners discharging toward each other, of a circular fender adapted to move to and from the space between said burners, said fender being adapted to carry the tire, a support, arms pivoted thereto and connected to said fender, and weights to raise and support said fender and arms, substantially as described.

In testimony that I claim the foregoing as my own I have hereto affixed my signature in the presence of two witnesses.

SILAS GLEAZEN.

Witnesses:
A. ROHRBAUGH,
E. D. NORTON.